US011660567B2

(12) United States Patent
Dolan et al.

(10) Patent No.: US 11,660,567 B2
(45) Date of Patent: May 30, 2023

(54) GAS DEHYDRATION WITH MIXED ADSORBENT/DESICCANT BEDS

(71) Applicant: BASF Corporation, Florham Park, NJ (US)

(72) Inventors: William B. Dolan, Yardley, PA (US); Michael LoCascio, Randolph, NJ (US)

(73) Assignee: BASF Corporation, Florham Park, NJ (US)

( * ) Notice: Subject to any disclaimer, the term of this patent is extended or adjusted under 35 U.S.C. 154(b) by 249 days.

(21) Appl. No.: 16/616,079

(22) PCT Filed: May 22, 2018

(86) PCT No.: PCT/US2018/033842
§ 371 (c)(1),
(2) Date: Nov. 22, 2019

(87) PCT Pub. No.: WO2018/217713
PCT Pub. Date: Nov. 29, 2018

(65) Prior Publication Data
US 2020/0114308 A1  Apr. 16, 2020

Related U.S. Application Data

(60) Provisional application No. 62/510,496, filed on May 24, 2017.

(51) Int. Cl.
*B01D 53/26* (2006.01)
*B01D 53/04* (2006.01)
(Continued)

(52) U.S. Cl.
CPC ....... *B01D 53/261* (2013.01); *B01D 53/0462* (2013.01); *B01J 20/103* (2013.01);
(Continued)

(58) Field of Classification Search
CPC .......... B01D 53/26; B01D 53/04; B01J 20/18; B01J 20/10; B01J 20/34; C10L 3/10
See application file for complete search history.

(56) References Cited

U.S. PATENT DOCUMENTS 2,356,890 A * 8/1944 Schulze ................. C10G 33/04
  208/188
2,882,244 A  4/1959 Milton
(Continued)

FOREIGN PATENT DOCUMENTS

DE  3045451  7/1981
RU  2447929 C1  4/2012
(Continued)

OTHER PUBLICATIONS

Extended European Search Report for EP Application No. 18805509.9 dated Jan. 29, 2021, 7 pages.
(Continued)

*Primary Examiner* — Youngsul Jeong
(74) *Attorney, Agent, or Firm* — Lowenstein Sandler LLP (57) ABSTRACT

Mixed adsorbent/desiccant beds comprising in some embodiments from about 20 vol % (volume percent) to about 90 vol % of one or more adsorbents and from about 10 vol % to about 80 vol % of one or more desiccants, based on the total volume of the adsorbent/desiccant mixture, prevent water reflux during thermal regeneration of adsorption beds in gas processing plants and methods.

11 Claims, 4 Drawing Sheets

(51) Int. Cl.
*B01J 20/10* (2006.01)
*B01J 20/18* (2006.01)
*C10L 3/10* (2006.01)
*B01J 20/34* (2006.01)
*B01J 20/28* (2006.01)

(52) U.S. Cl.
CPC ........... *B01J 20/18* (2013.01); *B01J 20/2803* (2013.01); *B01J 20/3408* (2013.01); *B01J 20/3483* (2013.01); *C10L 3/106* (2013.01); *B01D 2253/108* (2013.01); *B01D 2256/22* (2013.01); *B01D 2256/24* (2013.01); *B01D 2257/80* (2013.01); *C10L 2290/12* (2013.01); *C10L 2290/541* (2013.01)

(56) References Cited

U.S. PATENT DOCUMENTS

| | | | |
|---|---|---|---|
| 3,130,007 A | 4/1964 | Breck | |
| 3,862,900 A | 1/1975 | Reusser | |
| 3,865,924 A | 2/1975 | Gidaspow et al. | |
| 3,981,698 A | 9/1976 | Leppard | |
| 4,022,597 A | 5/1977 | Bacon | |
| 4,039,620 A | 8/1977 | Netteland et al. | |
| 4,140,504 A | 2/1979 | Campbell et al. | |
| 4,157,904 A | 6/1979 | Campbell et al. | |
| 4,171,964 A | 10/1979 | Campbell et al. | |
| 4,278,457 A | 7/1981 | Campbell et al. | |
| 4,433,981 A | 2/1984 | Slaugh et al. | |
| 4,493,715 A | 1/1985 | Hogan et al. | |
| 4,503,023 A | 3/1985 | Breck et al. | |
| 4,687,499 A | 8/1987 | Aghili | |
| 4,711,645 A | 12/1987 | Kumar | |
| 4,854,955 A | 8/1989 | Campbell et al. | |
| 4,986,835 A | 1/1991 | Uno et al. | |
| 5,089,034 A | 2/1992 | Markovs et al. | |
| 5,156,657 A | 10/1992 | Jain et al. | |
| 5,531,808 A | 7/1996 | Ojo et al. | |
| 5,587,003 A | 12/1996 | Bulow et al. | |
| 5,771,712 A | 6/1998 | Campbell et al. | |
| 5,779,767 A | 7/1998 | Golden et al. | |
| 5,953,935 A | 9/1999 | Sorensen | |
| 6,183,539 B1 | 2/2001 | Rode et al. | |
| 6,363,744 B2 | 4/2002 | Finn et al. | |
| 6,453,698 B2 | 9/2002 | Jain et al. | |
| 6,632,766 B2 | 10/2003 | Kanazirev | |
| 6,797,854 B1 * | 9/2004 | Jochem | B01D 53/261 585/824 |
| 2010/0011810 A1 | 1/2010 | Mak et al. | |
| 2010/0113854 A1 | 5/2010 | Bouvier et al. | |
| 2012/0190900 A1 * | 7/2012 | Weston | B01J 20/186 568/916 |

FOREIGN PATENT DOCUMENTS

RU 2569351 C2 11/2015
SU 1599060 A1 10/1990

OTHER PUBLICATIONS

International Search Report and Written Opinion for International Application No. PCT/US2018/033842 dated Jul. 30, 2018, 10 pages.

\* cited by examiner

GAS DEHYDRATION WITH MIXED ADSORBENT/DESICCANT BEDS

CROSS REFERENCE TO RELATED APPLICATION(S)

This application is a national stage entry under 35 U.S.C. § 371 of International Application No. PCT/US2018/033842, filed on May 22, 2018, which claims the benefit of priority of U.S. Provisional Patent Application No. 62/510,496, filed on May 24, 2017, the disclosures of which are hereby incorporated by reference herein in their entireties.

TECHNICAL FIELD

The invention relates to improved methods for removal of water from gas streams and to improved adsorbent beds.

BACKGROUND

The term "natural gas" is applied to gas produced from underground accumulations of widely varying composition. The main constituent of natural gas is methane. Apart from methane, natural gas generally includes other hydrocarbons, nitrogen, carbon dioxide, water and sometimes a small proportion of hydrogen sulfide. Hydrocarbon constituents include ethane ($C_2$), propane ($C_3$), butane ($C_4$), pentane ($C_5$), hexane ($C_6$), heptane ($C_7$), etc. Hydrocarbons having 5 or more carbon atoms are referred to as $C_{5+}$. Hydrocarbons having 2 or more carbon atoms are referred to as $C_{2+}$. Natural gas liquids (NGL) comprise hydrocarbons having 3 or more carbon atoms ($C_{3+}$). Constituents of a natural gas stream other than methane are referred to as "contaminants".

Lighter constituents, $C_1$ up to and including $C_4$, are in the gaseous phase at atmospheric temperature and pressure. Heavier constituents, $C_{5+}$, are in the gaseous phase at elevated temperatures during production from the subsurface and in liquid phase when the gas mixture is cooled.

Removal of contaminants, in particular water, carbon dioxide and hydrocarbons, from natural gas streams is important to prevent problems that can occur during their processing. Processing of natural gas includes use of low temperatures, requiring the removal of water and carbon dioxide to prevent formation of frozen solids.

Removal of water from natural gas streams is accomplished by contacting the natural gas stream with an adsorbent bed. Adsorption of contaminants from a gas mixture through solid adsorbents is a thermal exothermic process, known as thermal swing adsorption (TSA). The adsorbent must at times be regenerated, accomplished by applying heat, which serves to remove adsorbed material from the internal surface and pores of the adsorbent. To complete regeneration, the adsorbent is cooled to its initial temperature.

Typically, two or more adsorption beds are provided in natural gas purification processes, in some embodiments three; one in adsorption mode, one of them being regenerated at elevated temperature (regeneration mode) and one of them being cooled after regeneration (cooling mode). In a certain process, one adsorption bed is regenerated by passing a slipstream of untreated natural gas stream at an elevated temperature over the bed so that adsorbed contaminants are removed. The slipstream is first passed through the bed to be cooled, then heated and passed through the bed to be regenerated. The slipstream takes up contaminants that are removed from the adsorbent bed in regeneration mode. The contaminated slipstream is then passed through an air and water cooler, and condensed contaminants are separated off. The flash gas is recycled to the natural gas stream to be treated, upstream of the adsorption bed in adsorption mode.

In thermal swing regeneration processes, adsorbent beds are subject to the deleterious effects of repeated exposure to elevated temperatures and also refluxing water within the vessel housing the bed. During regeneration, hot gas saturated with hydrocarbons and water comes into contact with the upper section of the adsorbent bed and the vessel, resulting in condensation. The condensed liquids come into contact with advancing gas, resulting in refluxing of water in the vessel. Refluxing water in contact with molecular sieves of the adsorbent bed hastens deterioration of the bed.

There is a need for improved methods and systems to remove contaminants including water from natural gas streams. There is also a need for improved methods and systems to remove water from other gas streams, including olefin gas streams, carbon dioxide gas streams, etc.

SUMMARY

Accordingly, disclosed is a mixed adsorbent/desiccant bed effective for removing water from a wet gas stream to produce a dry gas stream, the bed having an axial length, a diameter, a volume, an inlet end and an outlet end, wherein from 0 to about 99% of the bed volume from the inlet end towards the outlet end contains one or more desiccants and substantially no adsorbents and wherein the remaining bed volume contains a mixture comprising from about 1 vol % (volume percent) to about 99 vol % of one or more adsorbents and from about 99 vol % to about 1 vol % of one or more desiccants, based on the total volume of the mixture.

Also disclosed is a mixed adsorbent/desiccant bed effective for removing water from a wet gas stream to produce a dry gas stream, the bed having an axial length, a diameter, a volume, an inlet end and an outlet end, wherein upon thermal regeneration, the capacity of the adsorbent is not exceeded.

Also disclosed is a mixed adsorbent/desiccant bed effective for removing water from a wet gas stream to produce a dry gas stream, the bed having an axial length, a diameter, a volume, an inlet end and an outlet end, wherein upon thermal regeneration, there is less free water compared to a same bed containing no desiccant.

Also disclosed is a system for removing water from a wet gas stream to produce a dry gas stream; the system comprising one or more of the mixed adsorbent/desiccant beds.

Also disclosed is a method of removing water from a wet gas stream to produce a dry gas stream, the method comprising routing the wet gas stream over one or more of the mixed adsorbent/desiccant beds or routing the wet gas stream through a system comprising one or more of the mixed beds.

BRIEF DESCRIPTION OF THE DRAWINGS

The disclosure is illustrated by way of example and not by way of limitation in the accompanying figures. For simplicity and clarity, features illustrated in the figures are not necessarily drawn to scale. For example, dimensions of some features may be exaggerated relative to other features for clarity. Further, where considered appropriate, reference labels have been repeated among the figures to indicate corresponding or analogous elements.

DETAILED DISCLOSURE

The present mixed adsorbent/desiccant beds are suitably employed in processing of gas streams; that is to remove water from or "dry" gas streams. Removal of water from gas streams is required for instance to prevent corrosion, for subsequent (downstream) low temperature processing, etc.

Gas streams include olefin streams containing predominantly ethylene, propylene or mixtures thereof. Drying of olefin streams is required for subsequent downstream processes.

Gas streams also include carbon dioxide streams or carbon dioxide-containing streams. In some embodiments, carbon dioxide-containing streams may be carbon dioxide and NGL-containing gas streams which must be dried prior to further processing, in certain embodiments dried to cryogenic specifications for a NGL recovery facility. Drying of $CO_2$ enables compression and transport while preventing corrosion issues.

In some embodiments, carbon dioxide gas streams and carbon dioxide-containing gas streams may contain from about 20 mol %, about 25 mol %, about 30 mol %, about 35 mol %, about 40 mol %, about 45 mol % or about 50 mol % to about 55 mol %, about 60 mol %, about 65 mol %, about 70 mol %, about 75 mol %, about 80 mol %, about 85 mol %, about 90 mol %, about 95 mol % or about 100 mol % $CO_2$. Balance is for example natural gas. Carbon dioxide gas may be used for example for enhanced oil recovery.

Gas streams include natural gas streams which require drying prior to further processing, for example prior to downstream NGL recovery processes or liquefied natural gas processes.

The gas streams to be dried ("wet" gas streams) contain water at levels of from about 10% to about 100% relative humidity (RH). In some embodiments, the relative humidity of the gas streams prior to drying may be from about 10%, about 15%, about 20%, about 25%, about 30%, about 35%, about 40%, about 45% or about 50% to about 55%, about 60%, about 65%, about 70%, about 75%, about 80%, about 85%, about 90%, about 95% or about 100%.

Dried gas streams according to present methods may, in some embodiments, contain ≤5.0, ≤4.5, ≤4.0, ≤3.5, ≤3.0, ≤2.5, ≤2.0, ≤1.5, ≤1.0, ≤0.5, ≤0.4, ≤0.3, ≤0.2, ≤0.10, ≤0.08 or ≤0.07 ppm (parts per million) water on a molar basis. The term "drying" means to remove water.

In certain embodiments, the present mixed adsorbent/desiccant beds may suitably be employed in processing of natural gas feed gas in a natural gas plant, which ultimately is processed into gas product for end-use consumption or "sales gas". Natural gas liquids may also be recovered in the process. In certain embodiments, a natural gas plant for recovery of natural gas liquids and sales gas may a turbo-expander plant.

Processing of natural gas requires low temperatures which require that the feed gas be dehydrated. Typically, natural gas feed gas is dried via routing the feed gas through one or more drying towers containing solid dehydrating agents. Wet natural gas is passed through a tower, for example from top to bottom. The dehydrating agents retain water and dry gas exits the tower for additional processing.

The present mixed adsorbent/desiccant beds contain desiccants and adsorbents as dehydrating (drying) agents. The drying agents are capable of reversibly adsorbing water.

In some embodiments, the mixed adsorbent/desiccant beds may contain from about 1 vol % (volume percent), about 3 vol %, about 5 vol %, about 10 vol %, about 20 vol %, about 25 vol %, about 30 vol %, about 35 vol %, about 40 vol %, about 45 vol % or about 50 vol % to about 55 vol %, about 60 vol %, about 65 vol %, about 70 vol %, about 75 vol %, about 80 vol %, about 85 vol %, about 90 vol %, about 95 vol %, about 97 vol % or about 99 vol % adsorbents, based on the total volume of the adsorbents and desiccants.

The mixed adsorbent/desiccant beds in some embodiments contain from about 1 vol %, about 3 vol %, about 5 vol %, about 10 vol %, about 15 vol %, about 20 vol %, about 25 vol %, about 30 vol %, about 35 vol % or about 40 vol % to about 45 vol %, about 50 vol %, about 55 vol %, about 60 vol %, about 65 vol %, about 70 vol %, about 75 vol %, about 80 vol %, about 85 vol %, about 90 vol %, about 95 vol %, about 97 vol % or about 99 vol % desiccants, based on the total volume of the adsorbents and desiccants.

In some embodiments, the volume ratio of adsorbents to desiccants in present mixed adsorbent/desiccant beds may be from about 99:1, about 95:5, about 9:1, about 8:1, about 7:1, about 6:1, about 5:1 or about 4:1 to about 3:1, about 2:1, about 1:1, about 1:2, about 1:3, about 1:4, about 1:5, about 1:6, about 1:7, about 1:8, about 1:9, about 5:95 or about 1:99. In some embodiments, the volume ratio of adsorbents to desiccants in present mixed adsorbent/desiccant beds may be from about 9:1, about 8:1, about 7:1, about 6:1, about 5:1 or about 4:1 to about 3:1, about 2:1, about 1:1, about 1:2 or about 1:3. In certain embodiments, there is a major amount of adsorbents and a minor about of desiccants, wherein the volume ratio of adsorbents to desiccants is from about 9:1 to about 2:1.

Desiccants and adsorbents are defined such that at a relative humidity of about 10%, the adsorbents adsorb more water than the desiccants and at a relative humidity of about 90%, the desiccants adsorb more water than the adsorbents, under ambient conditions, the amount of water being weight of water per weight of adsorbents or desiccants, respectively. Ambient conditions are 25° C. and 1 atmosphere pressure.

In certain embodiments, adsorbents may adsorb more water than the desiccants at a relative humidity of from about 10% to about 30%, and desiccants may adsorb more water than adsorbents at a relative humidity of from about 60% to about 90%.

In some embodiments, desiccants of the present invention may be materials capable of reversibly adsorbing water other than molecular sieves. In certain embodiments, desiccants include silica, silica gels, alumino-silicate gels, aluminas, activated carbons, titanias, activated clays and combinations thereof.

Suitable desiccants include Sorbead® products, hard, bead-shaped alumino-silicate gels. Suitable Sorbead® products include Sorbead® R, Sorbead® H, Sorbead® WS and combinations thereof. The desiccants may be in granular or bead form, in some embodiments having an average particle size of from about 0.7 mm to about 6 mm and a surface area of from about 75 $m^2/g$ to about 500 $m^2/g$.

In some embodiments, adsorbents may comprise molecular sieves. In certain embodiments, adsorbents may include molecular sieves selected from the group consisting of chabazite (zeolite D), clinoptilolite, erionite, faujasite (zeolite X or zeolite Y), ferrierite, mordenite, zeolite A, zeolite P, zeolite 3A, zeolite 4A, zeolite 5A, CTS-1 and zeolite 13X.

Adsorbents and desiccants are taught for example in U.S. Pat. Nos. 3,865,924; 3,981,698; 4,039,620; 4,433,981; 4,493,715; 4,711,645; 4,986,835; 5,156,657; 5,531,808; 5,587,003, 6,183,539 and 6,632,766.

The adsorbent/desiccant mixture may be substantially homogeneous, that is, with a substantially uniform distribution of the drying agents throughout the bed. Alternatively, they may be distributed as a gradient. In certain embodiments, the inlet end of the bed may contain a higher concentration of desiccant. In other embodiments, there may be a higher concentration of desiccant towards the outer sections of the bed. The inlet end of a bed is synonymous with the "front" end.

The adsorbents and desiccants may each be in particle form, that is, they may both be present as discrete particles. Granular forms, beads, pellets, pills, tablets or spheres are examples of particle forms and may be for example of substantially uniform size. Particle forms may be formed by methods including extrusion or pelletizing. Particle sizes of formed particles are in some embodiments from about 0.4 mm, about 0.7, about 1, about 2, about 3, about 4, about 5, about 6, about 7 or about 8 mm to about 9, about 10, about 11, about 12 or about 13 mm. Particle size means the largest diameter of a particle. Particle size refers to "average" particle size.

Alternatively, desiccants and adsorbents may be present together in a composite particle. Adsorbent/desiccant composite particles contain an adsorbent and a desiccant in a certain designed volume ratio and may be formed via extrusion or pelletizing.

Formed particles may contain minor amounts of further components such as binders; in certain embodiments at the volume levels discussed below.

Combinations of adsorbent/desiccant composite particles and/or adsorbent particles and/or desiccant particles may be present in the mixed beds.

In some embodiments, along half the length of the bed, the inlet end (inlet half) may contain ≥50 vol %, ≥55 vol %, ≥60 vol %, ≥65 vol %, ≥70 vol %, ≥75 vol %, ≥80 vol %, ≥85 vol % or ≥90 vol % of the total volume of the desiccant in the bed.

In other embodiments, the outer half of the diameter may contain ≥50 vol %, ≥55 vol %, ≥60 vol %, ≥65 vol %, ≥70 vol %, ≥75 vol %, ≥80 vol %, ≥85 vol % or ≥90 vol % of the total volume of the desiccant in the bed.

In some embodiments, in addition to desiccants and adsorbents, the present adsorption beds may contain other components, such as binders. Binders include metal oxides, clays, silicas, aluminas, silica-aluminas, silica-zirconias, silica-thorias, silica-berylias, silica-titanias, silica-alumina-thorias, silica-alumina to zirconias, mixtures of these and the like. Examples of clays include attapulgite, kaolin, volclay, sepiolite, polygorskite, kaolinite, bentonite, montmorillonite, illite and chlorite. In some embodiments, binders may be employed at levels of from about 0.5% to about 40% by volume, based on the total volume of adsorbents. In some embodiments, binders may be employed from about 1, about 2, about 4, about 6, about 8, about 10 or about 12 percent to about 15, about 20, about 25, about 30, about 35 or about 40 percent by volume, based on the total volume of adsorbents.

Figure 1:
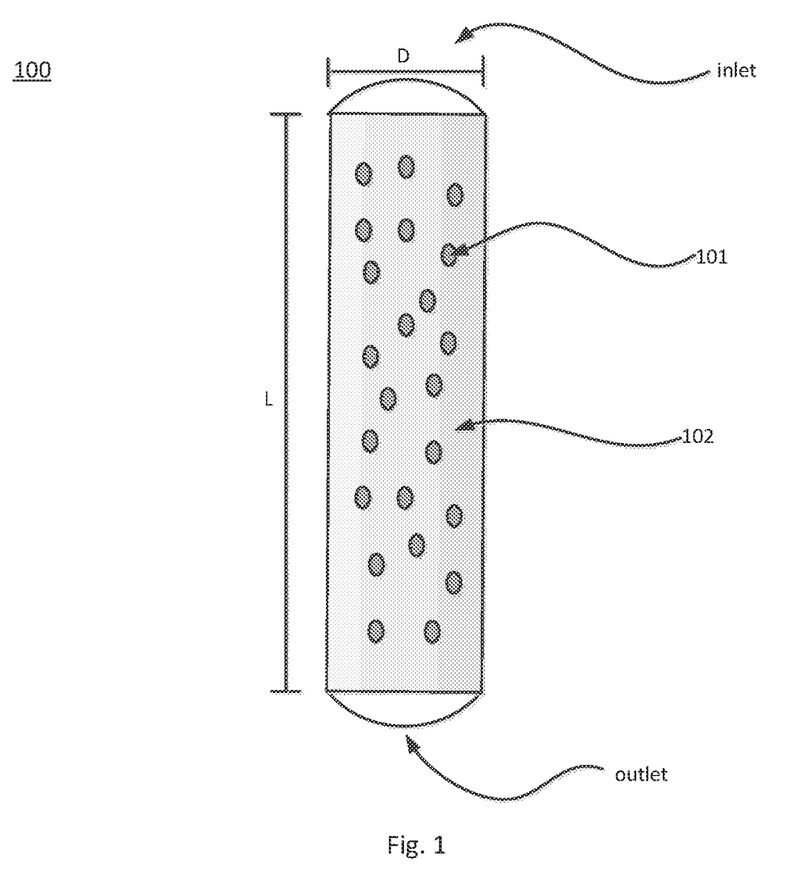
FIG. 1 is a schematic of a vessel containing a mixed adsorbent/desiccant bed, in an embodiment of the invention.
Figure 2:
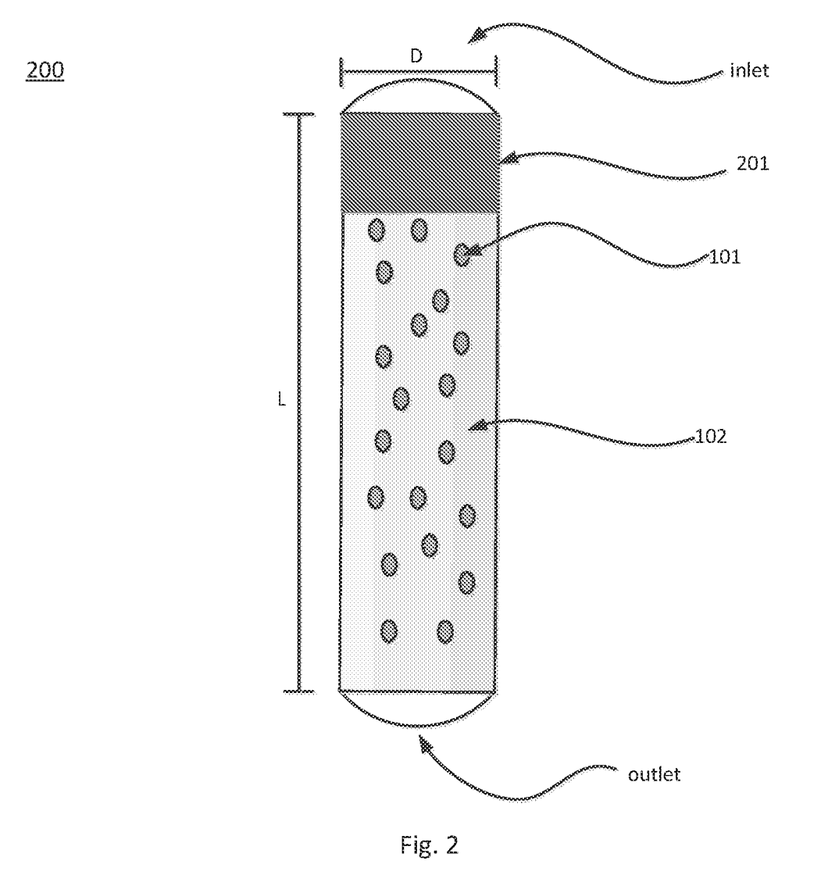
FIG. 2 is a schematic of a vessel containing a mixed adsorbent/desiccant bed, in an embodiment of the invention.

The mixed adsorbent/desiccant bed is housed in a vessel. An adsorbent tower 100 containing a mixed adsorbent/desiccant bed within a vessel is illustrated in FIG. 1. In the embodiment illustrated in FIG. 1, the bed contains a desiccant 101 indicated by the dark gray color distributed throughout an adsorbent material 102 (light gray). The entire mixed adsorbent/desiccant bed has an axial length L of the length and a diameter D. In FIG. 2, an adsorbent tower 200 is similar to that of FIG. 1, wherein a portion of the inlet end, 201, contains desiccant and no adsorbent.

The first 0 to 99% by volume of the bed may be substantially free of adsorbent and comprise desiccant. In some embodiments, the first >0% to about 99% of the volume of the bed may be substantially free of adsorbent and comprise desiccant. In some embodiments, the first about 1%, about 3%, about 5%, about 10%, about 15%, about 20%, about 25%, about 30%, about 35%, about 40%, about 45%, about 50%, about 55%, about 60%, about 65%, about 70%, about 75%, about 80%, about 85%, about 95%, about 96%, about 97% or about 98% by volume of the bed may be substantially free of adsorbent and comprise desiccant, wherein the remainder of the bed comprises the adsorbent/desiccant mixture. The "first" volume of the bed means from the inlet end towards the outlet end.

Present mixed beds, systems and methods prevent refluxing water (free water) during thermal regeneration of adsorption beds in natural gas processing. In some embodiments, upon thermal regeneration of a present mixed bed, the capacity of the adsorbent is not exceeded or is exceeded less than the same bed containing no desiccant. Capacity is defined as the micropore capacity of the adsorbent. In certain embodiments, upon thermal regeneration, the capacity is exceeded less than the same bed containing an 85/5 volume mixture of adsorbent/desiccant.

In some embodiments, upon thermal regeneration, there is less free water compared to a same bed containing no desiccant or compared to a same bed containing an 85/5 volume mixture of adsorbent/desiccant. A "same bed" means identical except for the adsorbent/desiccant mixture. In some embodiments, regeneration conditions may be about 270° C., about 1000 psia for about 12 hours.

A system comprises a present mixed adsorbent/desiccant bed and one or more further processing elements. The present mixed adsorbent/desiccant bed may be considered a processing element. Further processing elements include one or more further adsorbent beds, heat exchangers, compressors, expanders, reboilers, reflux drums, temperature controllers, turbo-expanders, condensers, separators, valves and the like. A system may be part of a plant; in certain embodiments, a present system may be part of a natural gas processing plant.

Advantageously, in a system, there may be two or more mixed beds. In some embodiments, one bed will be in "adsorption mode" and one will be in "desorption mode". In certain embodiments, there may be three mixed beds; with, in some embodiments, at least one in adsorption mode, at least one in desorption mode and one in a cooling mode at any point or step during processing. The term "mode" means an element is performing the defined step during operation.

In one embodiment, the present system is part of a natural gas plant wherein the mixed bed is employed for dehydrating natural gas in the plant. The feed gas may contain ≤165 ppm water; in some embodiments from about 80 ppm, about 90 ppm, about 100 ppm or about 110 ppm to about 120 ppm, about 130 ppm, about 135 ppm, about 140 ppm about 150 ppm, about 160 ppm or about 165 ppm water, on a molar basis. The feed gas may contain ≤2.2 mol % (mole percent) carbon dioxide; in some embodiments from about 0.8, about 0.9, about 1.0, about 1.1, about 1.2, about 1.3, about 1.4 or about 1.5 mol % to about 1.6, about 1.7, about 1.8, about 1.9, about 2.0, about 2.1 or about 2.2 mol % carbon dioxide.

Alternatively, the feed gas may exceed these levels of water and/or carbon dioxide; in some embodiments, the relative humidity may be up to 100%. In certain embodiments, the feed gas may exceed these levels of water and/or carbon dioxide by up to about 10%, in some embodiments up to about 1%, about 2%, about 3%, about 4%, about 5%, about 6%, about 7%, about 8% or up to about 9%.

The feed gas entering the plant may contain from about 87, about 88, about 89 or about 90 mol % to about 91, about 92, about 93, about 94, about 95 or about 96 mol % methane and from about 4, about 5, about 6 or about 7 mol % to about 8, about 9, about 10, about 11 or about 12 mol % $C_{2^+}$ hydrocarbons.

The feed gas in certain embodiments enters the plant at an elevated pressure. In some embodiments, the feed gas may be routed over a mixed adsorbent/desiccant bed at a pressure from about 650, about 700, about 750, about 800, about 850 or about 900 psia to about 950, about 1000, about 1050, about 1100, about 1150, about 1200, about 1300, about 1350, about 1400, about 1450, about 1500, about 1550, about 1600, about 1650, about 1700, about 1750, about 1800, about 1850, about 1900, about 1950 or about 2000 psia. Routing the feed gas over the mixed bed places the feed gas in contact with the adsorbent and serves to remove water and/or carbon dioxide from the feed gas.

In some embodiments, the temperature of the feed gas may be from about 10° C., about 20° C., about 30° C. or about 40° C. to about 50° C., about 60° C., about 70° C., about 80° C., about 90° C. or about 100° C. Temperatures of the natural gas streams at other points in processing are those typical in NGL recovery plants.

This gas stream from which water and/or carbon dioxide has been removed is termed a "dry natural gas stream". The dry natural gas stream may initially be at an elevated pressure. The dry natural gas stream may contain ≤5.0, ≤4.5, ≤4.0, ≤3.5, ≤3.0, ≤2.5, ≤2.0, ≤1.5, ≤1.0, ≤0.5, ≤0.4, ≤0.3, ≤0.2, ≤0.10, ≤0.08 or ≤0.07 ppm water on a molar basis.

The dry natural gas stream may recover ≤70%, ≤60%, ≤50%, ≤40%, ≤30%, ≤20%, ≤10%, ≤5%, ≤1%, ≤0.5%, ≤0.3% or ≤0.1% carbon dioxide of the feed gas. The term "recovers" (recovery) means molar flow rate of $CO_2$ in the dry gas stream relative to the molar flow rate of $CO_2$ in the feed gas stream; or (molar flow rate of the dry gas stream) ·(moles $CO_2$ in the dry gas stream)/(molar flow rate of the feed gas stream)/(moles $CO_2$ in the feed gas stream).

In general, the dry natural gas stream will contain less than 2.5 moles of $CO_2$ relative to 100 moles of $C_{2^+}$ hydrocarbons. This is a typical specification of acceptable $CO_2$ content in a $C_{2^+}$ stream. In general, the $CO_2$ recovery level of the adsorption system is set to ensure the $CO_2$ specification in the $C_{2^+}$ can be met. This may be accomplished in conjunction with other approaches in the distillation column, such as those described by Hudson, et. al., "Reduced Treating Requirements for Cryogenic NGL Recovery Plants", presented at the 80$^{th}$ Annual Convention of the Gas Processors Association, Mar. 12, 2001, San Antonio, Tex.

The dry natural gas stream at may be routed through further elements; in some embodiments through a demethanizer distillation column. $C_{2^+}$ or $C_{3^+}$ hydrocarbons may be recovered from the bottom of a demethanizer column.

Natural gas processing plants are disclosed for instance in U.S. Pat. No. 4,854,955 and published U.S. app. No. 2010/0011810. NGL recovery is also described for example in U.S. Pat. Nos. 4,022,597; 4,140,504; 4,157,904; 4,171,964; 4,278,457; 4,687,499; 5,771,712; 5,953,935; 6,363,744 and 6,453,698.

A feed gas is a gas that enters a natural gas processing plant; the plant suitable to produce sales gas and/or to recover natural gas liquids. The dry natural gas stream has lower water content than the feed gas and has been treated with a mixed adsorbent/desiccant bed.

Preparation of zeolites is known and involves for example forming a reaction mixture composed of reactive sources of the components which mixture is then hydrothermally reacted to form the zeolite. Synthesis of zeolite Y is described for example in U.S. Pat. Nos. 3,130,007 and 4,503,023 and that of zeolite X for example in U.S. Pat. Nos. 2,883,244 and 3,862,900.

In some embodiments, reactive sources of "M" metals include halide and hydroxide compounds of alkali or alkaline earth metals such as sodium chloride, sodium hydroxide, potassium hydroxide, etc. Aluminum sources include but are not limited to boehmite alumina, gamma alumina and soluble aluminates such as sodium aluminate or tetraethylammonium aluminates. Finally, silicon sources include, silica, silica hydrosol, silicic acid, etc. The reactive sources are combined into a reaction mixture which has a composition in terms of mole ratios of the oxides of: $SiO_2/Al_2O_3$=8 to 12, $M_2O/Al_2O_3$=2.5 to 4 and $H_2O/M_2O$=120 to 180 and the mixture is then reacted to form the zeolite.

As synthesized, the zeolites will contain "M" metals in the channels and/or pores. The function of these metal cations is to balance the negative charge of the zeolite lattice. Since these cations are not part of the framework, they are exchangeable and are said to occupy ion-exchange sites. The amount of metal cations present in the zeolite is referred to as the stoichiometric amount or the maximum ion exchange capacity of the zeolite. This amount is usually expressed in moles.

Since the metal cations initially present in the zeolite are exchangeable they can be exchanged for other (different) alkali metals, alkaline earth metals, hydronium ions, ammonium ions or mixtures thereof. Typically, if the zeolite contains hydronium or ammonium ions, these ions are exchanged with alkali metals, alkaline earth metals or mixtures thereof, either before or during the preparation of the adsorbent.

Present zeolites may contain a further metal component in addition to the metal cation (M) present in the exchange sites of the zeolite. The further metal component can be the same or different than the M metal. In an embodiment, the M metal in a zeolite can be potassium whereas the further metal can be sodium. The further metal may be present in an amount of at least 10 mol % the stoichiometric amount of metal M (expressed as the oxide) needed to balance the negative charge of the zeolite lattice. The further metal may be termed "excess metal additive".

Examples of further metal components include but are not limited to sodium, potassium, lithium, rubidium, cesium, calcium, strontium, magnesium, barium, zinc and copper. The source of the further metal can be any compound which at activation conditions decomposes to the metal oxide. Examples of these sources are nitrates, hydroxides, carboxylates, carbonates and oxides of the metals, as taught for instance in U.S. Pat. No. 6,632,766. Present composite particles may include excess metal additive and may be prepared as taught in U.S. Pat. No. 6,632,766.

The volume percents of components of a mixed bed are determined on an as-prepared loaded bed—that is in a "dry" state prior to use at ambient conditions.

The term "configured" as used in the description and claims is intended to be an open-ended term as are the terms "comprising" or "containing". The term "configured" is not meant to exclude other possible elements. The term "configured" may be equivalent to "adapted".

The articles "a" and "an" herein refer to one or to more than one (e.g. at least one) of the grammatical object. Any ranges cited herein are inclusive. The term "about" used throughout is used to describe and account for small fluctuations.

The term "about" may mean the numeric value may be modified by ±5%, ±4%, ±3%, ±2%, ±1%, ±0.5%, ±0.4%, ±0.3%, ±0.2%, ±0.1% or ±0.05%. All numeric values are modified by the term "about" whether or not explicitly indicated. Numeric values modified by the term "about" include the identified value; that is "about 5.0" includes 5.0. Measurable levels of atoms, elements or molecules may depend on the method of detection. In part, the term "about" is intended to provide for this.

The term "substantially no" means not purposefully added and that only minor or inadvertent amounts may be present. In some embodiments, "substantially no" may mean <5%, <4%, <3%, <2%, <1%, <0.5%, <0.4%, <0.3%, <0.2%, <0.1% or <0.05% may be present, by volume. The term "substantially uniformly" in some embodiments means a deviation from uniformity of ±5%, ±4%, ±3%, ±2%, ±1%, ±0.5%, ±0.4%, ±0.3%, ±0.2%, ±0.1% or ±0.05%, by, by volume or by weight. The term "substantially" may have the meaning of "about".

U.S. patents and published U.S. patent applications listed herein are hereby incorporated by reference.

Unless otherwise indicated, all parts and percentages are on a molar basis or on a volume basis.

In a first embodiment directed to a mixed adsorbent/desiccant bed, disclosed is a mixed adsorbent/desiccant bed effective for removing water from a wet gas stream to produce a dry gas stream, the bed having an axial length, a diameter, a volume, an inlet end and an outlet end, wherein from 0 to about 99% of the bed volume from the inlet end towards the outlet end contains one or more desiccants and substantially no adsorbents and wherein the remaining bed volume contains a mixture comprising from about 1 vol % to about 99 vol % of one or more adsorbents and from about 99 vol % to about 1 vol % of one or more desiccants, based on the total volume of the mixture; or wherein the remaining bed volume contains a mixture comprising from any of about 1 vol %, about 2 vol %, about 3 vol %, about 4 vol %, about 5 vol % about 7 vol %, about 10 vol %, about 15 vol %, about 20 vol %, about 25 vol %, about 30 vol %, about 35 vol %, about 40 vol %, about 45 vol %, about 50 vol % or about 55 vol % to any of about 60 vol %, about 65 vol %, about 70 vol %, about 75 vol %, about 80 vol %, about 85 vol %, about 90 vol %, about 93 vol %, about 95 vol %, about 96 vol %, about 97 vol %, about 98 vol % or about 99 vol % of the one or more adsorbents and from any of about 99 vol %, about 98 vol %, about 97 vol %, about 96 vol %, about 95 vol % about 93 vol %, about 90 vol %, about 85 vol %, about 80 vol %, about 75 vol %, about 70 vol %, about 65 vol %, about 60 vol %, about 55 vol %, about 50 vol % or about 45 vol % to any of about 40 vol %, about 35 vol %, about 30 vol %, about 25 vol %, about 20 vol %, about 15 vol %, about 10 vol %, about 7 vol %, about 5 vol %, about 4 vol %, about 3 vol %, about 2 vol % or about 1 vol % of the one or more desiccants, based on the total volume of the mixture.

In a second embodiment, disclosed is a mixed bed according to the first embodiment, wherein from >0%, about 1%, about 2%, about 3%, about 4%, about 5%, about 10%, about 15%, about 20%, about 25%, about 30%, about 35% or about 40% to about 45%, about 50%, about 55%, about 60%, about 65%, about 70%, about 75%, about 80%, about 85%, about 90% or about 95% of the volume of the bed from the inlet end towards the outlet end contains one or more desiccants and substantially no adsorbents.

In a third embodiment, disclosed is a mixed bed according to the first or second embodiments, wherein the gas stream is an olefin gas stream, a carbon dioxide or carbon dioxide-containing gas stream or a natural gas stream.

In a fourth embodiment, disclosed is a mixed bed according to any of the preceding embodiments, wherein the wet gas stream has a relative humidity from about 10%, about 15%, about 20%, about 25%, about 30%, about 35%, about 40%, about 45% or about 50% to about 55%, about 60%, about 65%, about 70%, about 75%, about 80%, about 85%, about 90%, about 95% or about 100%.

In a fifth embodiment, disclosed is a mixed bed according to any of the preceding embodiments, wherein the dry gas stream contains ≤5.0, ≤4.5, ≤4.0, ≤3.5, ≤3.0, ≤2.5, ≤2.0, ≤1.5, ≤1.0, ≤0.5, ≤0.4, ≤0.3, ≤0.2, ≤0.10, ≤0.08 or ≤0.07 ppm water on a molar basis. In a sixth embodiment, disclosed is a mixed bed according to any of the preceding embodiments, wherein the adsorbents and desiccants are each in particle form.

In a seventh embodiment, disclosed is a mixed bed according to any of the first to fifth embodiments, wherein in the mixture, the adsorbents and desiccants are combined together in composite particles. In an eighth embodiment, disclosed is a mixed bed according to embodiments 6 or 7, wherein the average particle sizes are from about 0.4 mm, about 0.7, about 1, about 2, about 3, about 4, about 5, about 6, about 7 or about 8 mm to about 9, about 10, about 11, about 12 or about 13 mm.

In a ninth embodiment, disclosed is a mixed bed according to any of the preceding embodiments, wherein at a relative humidity of about 10%, the adsorbents adsorb more water than the desiccants and at a relative humidity of about 90%, the desiccants adsorb more water than the adsorbents, under ambient conditions, the amount of water being weight of water per weight of adsorbents or desiccants, respectively.

In a tenth embodiment, disclosed is a mixed bed according to any of the preceding embodiments, wherein the mixture comprises from about 20 vol %, about 25, about 30, about 35, about 40, about 45 or about 50 vol % to about 55 vol %, about 60, about 65, about 70, about 75, about 80, about 85 or about 90 vol % adsorbents, based on the total volume of the mixture.

In an eleventh embodiment, disclosed is a mixed bed according to any of the preceding embodiments, wherein the mixture comprises from about 10 vol %, about 15, about 20, about 25, about 30, about 35 or about 40 vol % to about 45 vol %, about 50 or about 55, about 60 vol %, about 65, about 70, about 75 or about 80 vol % desiccants, based on the total volume of the mixture.

In a twelfth embodiment, disclosed is a mixed bed according to any of the preceding embodiments, wherein in the mixture, the volume ratio of adsorbents to desiccants is from about 9:1, about 8:1, about 7:1, about 6:1, about 5:1 or about 4:1 to about 3:1, about 2:1, about 1:1, about 1:2 or about 1:3. In a thirteenth embodiment, disclosed is a mixed bed according to any of the preceding embodiments, wherein the desiccant does not include molecular sieves.

In a fourteenth embodiment, disclosed is a mixed bed according to any of the preceding embodiments, wherein the desiccants are selected from the group consisting of silica gels, alumino-silicate gels, aluminas, activated carbons, titanias, activated clays and combinations thereof. In a fifteenth embodiment, disclosed is a mixed bed according to any of the preceding embodiments, wherein the adsorbents comprise one or more molecular sieves.

In a sixteenth embodiment, disclosed is a mixed bed according to any of the preceding embodiments, wherein the adsorbents comprise one or more molecular sieves selected from the group consisting of chabazite (zeolite D), clinoptilolite, erionite, faujasite (zeolite X or zeolite Y), ferrierite, mordenite, zeolite A, zeolite P, zeolite 3A, zeolite 4A, zeolite 5A and zeolite 13X. In a seventeenth embodiment, disclosed is a mixed bed according to any of the preceding embodiments comprising one or more adsorbents selected from the group consisting zeolite 3A, zeolite 4A and zeolite 5A. In an eighteenth embodiment, disclosed is a mixed bed according to embodiment 17, wherein the zeolites are in particle form.

In a nineteenth embodiment, disclosed is a mixed bed according to embodiments 17 or 18, wherein the zeolites contain an alkali or alkali earth metal in the ion-exchange sites and a further metal, which further metal component may be the same or different than the metal in the ion-exchange sites.

In a twentieth embodiment, disclosed is a mixed bed according to any of the preceding embodiments, wherein the desiccants are selected from the group consisting of alumino-silicate gels and the adsorbents are selected from the group consisting of zeolites, in some implementations zeolites 3A, 4A or 5A. In a twenty-first embodiment, disclosed is a mixed bed according to the twentieth embodiment, wherein the alumino-silicate gels and the zeolites are each in particle form.

In a twenty-second embodiment, disclosed is a mixed bed according to any of embodiments 1-19, wherein the desiccants are selected from the group consisting of aluminas and the adsorbents are selected from the group consisting of zeolites, in certain implementations zeolites 3A, 4A or 5A.

In a twenty-third embodiment, disclosed is a mixed bed according to embodiment 22, wherein the aluminas and the zeolites are each in particle form. In a twenty-fourth embodiment, disclosed is a mixed bed according to any of the preceding embodiments, wherein the desiccant is in granular form or in the form of beads, pellets, pills, tablets or spheres. In a twenty-fifth embodiment, disclosed is a mixed bed according to any of the preceding embodiments, wherein in the mixture the desiccant is substantially uniformly distributed throughout the adsorbent. In a twenty-sixth embodiment, disclosed is a mixed bed according to any of embodiments 1 to 24, wherein in the mixture, the desiccant material is distributed in a gradient throughout the adsorbent material.

In a twenty-seventh embodiment, disclosed is a mixed bed according to the twenty-sixth embodiment, wherein in the mixture, the inlet end of the bed contains a higher concentration of desiccant than the outlet end; in some implementations, the inlet half of the mixture section by length may contain ≥50 vol %, ≥55 vol %, ≥60 vol %, ≥65 vol %, ≥70 vol %, ≥75 vol %, ≥80 vol %, ≥85 vol % or ≥90 vol % of the total volume of the desiccant in the mixture.

In a twenty-eighth embodiment, disclosed is a mixed bed according to embodiments 26 or 27, wherein in the mixture, there is a higher concentration of desiccant towards the outer part of the bed; in some implementations, the outer half of the diameter of the mixture may contain ≥50 vol %, ≥55 vol %, ≥60 vol %, ≥65 vol %, ≥70 vol %, ≥75 vol %, ≥80 vol %, ≥85 vol % or ≥90 vol % of the total volume of the desiccant in the mixture.

In a twenty-ninth embodiment, disclosed is a mixed bed according to any of the preceding embodiments, wherein upon thermal regeneration, the capacity of the adsorbent is not exceeded. In a thirtieth embodiment, disclosed is a mixed bed according to any of the preceding embodiments, wherein upon thermal regeneration, there is less free water compared to a same size bed containing no desiccant. In a thirty-first embodiment, disclosed is a mixed bed according to any of the preceding embodiments, comprising a binder.

In a thirty-second embodiment, disclosed is a mixed adsorbent/desiccant bed effective for removing water from a wet gas stream to produce a dry gas stream, the bed having an axial length, a diameter, a volume, an inlet end and an outlet end, wherein upon thermal regeneration, the capacity of the adsorbent is not exceeded. This embodiment may be modified by any of the preceding embodiments.

In a thirty-third embodiment, disclosed is a mixed adsorbent/desiccant bed effective for removing water from a wet gas stream to produce a dry gas stream, the bed having an axial length, a diameter, a volume, an inlet end and an outlet end, wherein upon thermal regeneration, there is less free water compared to a same bed containing no desiccant. This embodiment may be modified by any of the preceding embodiments.

In a thirty-fourth embodiment, disclosed is a system for removing water from a wet gas stream to produce a dry gas stream; the system comprising one or more mixed adsorbent/desiccant beds according to any of the preceding mixed bed embodiments.

In a thirty-fifth embodiment, disclosed is a system according to the thirty-fourth embodiment, configured to remove water from a natural gas stream; in some implementations a natural gas stream at a pressure of from about 500 psia, about 550, about 600, about 650, about 700, about 750, about 800, about 850, about 900 or about 950 psia to about 1000, about 1050, about 1100, about 1150, about 1200, about 1250, about 1300, about 1350, about 1400, about 1450, about 1500, about 1550, about 1600, about 1650, about 1700, about 1750 or about 1800 psia.

In a thirty-sixth embodiment, disclosed is a system according to the thirty-fifth embodiment, wherein the system is configured to remove water from a natural gas feed gas prior to NGL recovery or prior to liquefied natural gas production. In a thirty-seventh embodiment, disclosed is a system according to the thirty-fourth embodiment, wherein the system is configured to remove water from an olefin gas stream.

In a thirty-eighth embodiment, disclosed is a system according to the thirty-fourth embodiment, wherein the system is configured to remove water from a carbon dioxide gas stream or a carbon dioxide-containing gas stream.

In a thirty-ninth embodiment, disclosed is a system according to any of the preceding system embodiments, comprising two or more mixed beds; in some implementations three mixed beds. In a fortieth embodiment, disclosed is a system according to the thirty-ninth embodiment, configured to have at least one mixed bed in an adsorption mode and at least one in a desorption mode.

In a forty-first embodiment, disclosed is a system according to any of the preceding system embodiments, comprising a heat exchanger. In a forty-second embodiment, disclosed is a system according to any of the preceding system embodiments, comprising a compressor. In a forty-third embodiment, disclosed is a system according to any of the preceding system embodiments, comprising an expander.

In a forty-fourth embodiment, disclosed is a system according to any of the preceding system embodiments, comprising a separator. In a forty-fifth embodiment, disclosed is a system according to any of the preceding system embodiments, comprising a condenser. In a forty-sixth embodiment, disclosed is a system according to any of the preceding system embodiments, comprising a turbo-expander.

In a forty-seventh embodiment, disclosed is a system according to any of the preceding system embodiments, configured to recover $C2_+$ and/or $C3_+$ hydrocarbons. In a forty-eighth embodiment, disclosed is a system according to any of the preceding system embodiments, configured to produce sales gas. In a forty-ninth embodiment, disclosed is a system according to any of the preceding system embodiments, configured to subject the mixed adsorbent/desiccant bed or beds to thermal swing adsorption.

In a fiftieth embodiment, disclosed is a method of removing water from a wet gas stream to produce a dry gas stream, the method comprising routing the wet gas stream over a mixed adsorbent/desiccant bed according to any of the preceding mixed bed embodiments or routing the wet gas stream through a system according to any of the preceding system embodiments.

In a fifty-first embodiment, disclosed is a method according to the fiftieth embodiment, wherein the gas is a natural gas stream. In a fifty-second embodiment, disclosed is a method according to the fifty-first embodiment, the method further comprising NGL liquefied natural gas production.

In a fifty-third embodiment, disclosed is a method according to the fifty-first or fifty-second embodiments, comprising sales gas production. In a fifty-fourth embodiment, disclosed is method according to the fiftieth embodiment, wherein the gas stream is an olefin gas stream. In a fifty-fifth embodiment, disclosed is a method according to the fiftieth embodiment, wherein the gas stream is a carbon dioxide gas stream or a carbon dioxide-containing gas stream.

In a fifty-sixth embodiment, disclosed is a method according to any of the preceding method embodiments, wherein the wet gas stream has a relative humidity from about 10%, about 15%, about 20%, about 25%, about 30%, about 35%, about 40%, about 45% or about 50% to about 55%, about 60%, about 65%, about 70%, about 75%, about 80%, about 85%, about 90%, about 95% or about 100%.

In a fifty-seventh embodiment, disclosed is a method according to any of the preceding method embodiments, wherein the dry gas stream contains ≤5.0, ≤4.5, ≤4.0, ≤3.5, ≤3.0, ≤2.5, ≤2.0, ≤1.5, ≤1.0, ≤0.5, ≤0.4, ≤0.3, ≤0.2, ≤0.10, ≤0.08 or ≤0.07 ppm water on a molar basis. In a fifty-eighth embodiment, disclosed is a method according to any of the preceding method embodiments, comprising regenerating the mixed adsorbent/desiccant bed with a process comprising thermal swing.

The above description of illustrated embodiments of the disclosure, including what is described in the Abstract, is not intended to be exhaustive or to limit the disclosure to the precise forms disclosed. While specific embodiments of, and examples for, the disclosure are described herein for illustrative purposes, various equivalent modifications are possible within the scope of the disclosure, as those skilled in the relevant art will recognize.

Example 1 Comparative

An adsorbent bed is prepared with the first 10% by volume Sorbead® WS with the remaining 90% volume containing a 95/5 volume (vol/vol) mix of 4A molecular sieve/Sorbead® WS. A standard engineering simulation is performed consisting of material balances, energy balances, a linear driving force approximation for the adsorbed phase and an equilibrium to describe affinity for the feed components to the surface. During the adsorption step gas having about 20% relative humidity (RH) is fed down through the bed.

Sorbead® is a bead-shaped alumino-silicate gel, a present desiccant. Molecular sieve 4A is a present adsorbent.

Figure 3:
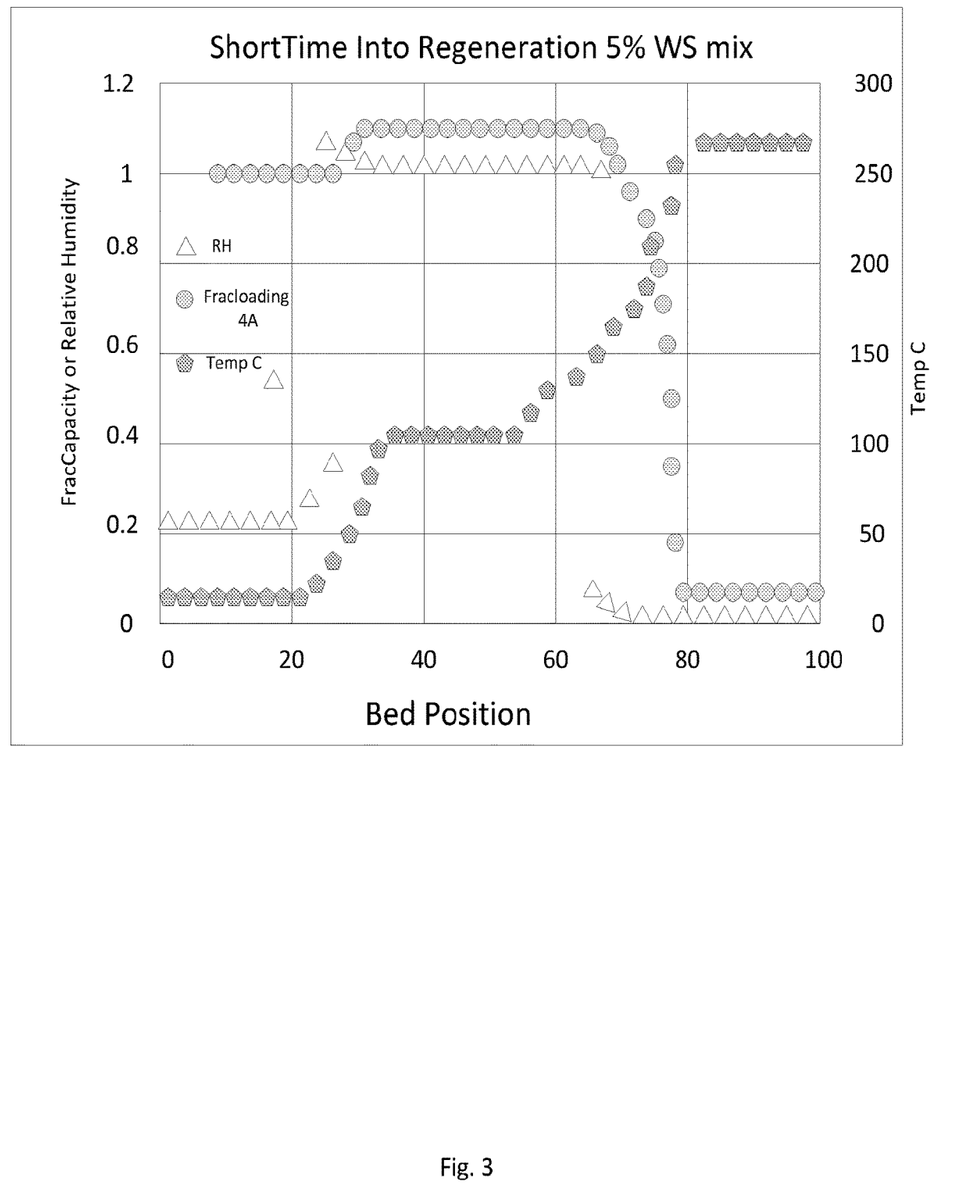
FIG. 3 depicts a bed profile of Example 1 partially through the regeneration step.

FIG. 3 illustrates a bed profile partially through the regeneration step. It is observed that there is a section of the bed that exceeds the capacity of the sieve, defined as the micropore capacity of the sieve. It is also evident that the temperature on the plateau is 109° C. and the relative humidity on the plateau is essentially 100%.

Example 2 Inventive

Figure 4:
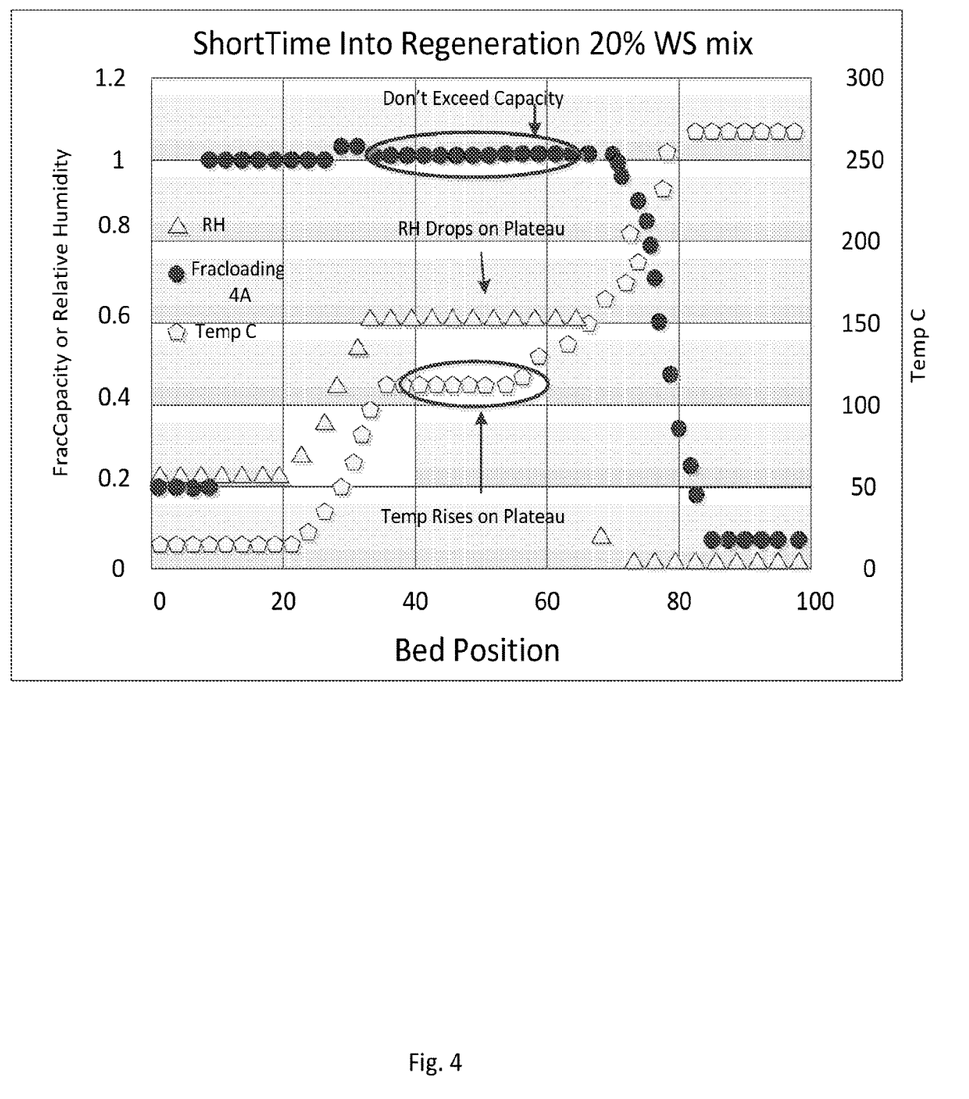
FIG. 4 depicts a bed profile of Example 2 partially through the regeneration step.

An adsorbent bed is prepared with the first 10% by volume Sorbead® WS with the remaining 90% volume containing a 80/20 volume mix of 4A molecular sieve/Sorbead® WS. A standard engineering simulation is performed as above. FIG. 4 illustrates a bed profile partially through the regeneration step. It is seen the section of the bed that previously exceeded the capacity of the sieve no longer does so. It is also observed that the temperature on the plateau is 120° C. and the relative humidity on the plateau is below 100%. Conditions that minimize free water will enhance the bed life.

The invention claimed is:

1. A mixed adsorbent/desiccant bed effective for removing water from a wet gas stream to produce a dry gas stream, the bed having an axial length, a diameter, a bed volume, an inlet end and an outlet end,
   wherein from about 5 vol % to about 25 vol % of the bed volume from the inlet end towards the outlet end contains one or more desiccants comprising alumino-silicate gel and substantially no molecular sieves and other adsorbents, and the remaining bed volume contains a mixture comprising from about 1 vol % to about 99 vol % of one or more adsorbents comprising one or more molecular sieves and from about 99 vol % to about 1 vol % of the one or more desiccants comprising the alumino-silicate gel, based on a total volume of the mixture, wherein the one or more desiccants and the one or more adsorbents are each present independently as discrete particles, and
   wherein at a relative humidity of about 10%, the one or more adsorbents adsorb more water than the desiccants and at a relative humidity of about 90%, the one or more desiccants adsorb more water than the adsorbents, under ambient conditions, the amount of water absorbed being weight of water per weight of the adsorbents or desiccants.

2. The mixed absorbent/desiccant bed according to claim 1, wherein the wet gas stream is an olefin gas stream, a carbon dioxide or carbon dioxide-containing gas stream or a natural gas stream.

3. The mixed adsorbent/desiccant bed according to claim 1, wherein the wet gas stream has a relative humidity from about 10% to about 100% and wherein the dry gas stream contains ≤5.0 ppm water on a molar basis.

4. The mixed adsorbent/desiccant bed according to claim 1, wherein the one or more molecular sieves are selected from the group consisting of chabazite comprising zeolite D, clinoptilolite, erionite, faujasite comprising zeolite X or zeolite Y, ferrierite, mordenite, zeolite A, zeolite P, zeolite 3A, zeolite 4A, zeolite 5A and zeolite 13X.

5. The mixed adsorbent/desiccant bed according to claim 1, wherein in the mixture the desiccants are substantially uniformly distributed throughout the adsorbents.

6. The mixed adsorbent/desiccant bed according to claim 1, wherein in the mixture, the desiccants are distributed in a gradient throughout the adsorbents.

7. The mixed adsorbent/desiccant bed according to claim 1, wherein upon thermal regeneration, a micropore capacity of the adsorbent is not exceeded compared to the same bed containing no desiccant.

8. The mixed adsorbent/desiccant bed according to claim 1, wherein upon thermal regeneration, there is less free water in the mixed adsorbent/desiccant bed compared to a same size bed containing no desiccant.

9. The mixed adsorbent/desiccant bed according to claim 1, wherein the mixed adsorbent/desiccant bed further comprises a binder.

10. A system for removing water from a wet gas stream to produce a dry gas stream, the system comprising one or more of the mixed adsorbent/desiccant beds according to claim 1 and comprising one or more further processing elements, wherein the system is configured to subject the mixed adsorbent/desiccant bed or beds to thermal swing adsorption.

11. A method of removing water from a wet gas stream to produce a dry gas stream, the method comprising routing the wet gas stream over the mixed adsorbent/desiccant bed according to claim 1.

* * * * *